(12) United States Patent
Tseng et al.

(10) Patent No.: US 9,702,894 B2
(45) Date of Patent: Jul. 11, 2017

(54) MONOLITHIC Z-AXIS TORSIONAL CMOS MEMS ACCELEROMETER

(71) Applicant: National Applied Research Laboratories, Hsinchu (TW)

(72) Inventors: Sheng-Hsiang Tseng, Hsinchu (TW); Yi-Jen Wang, Hsinchu (TW); Hann-Huei Tsai, Hsinchu (TW); Ying-Zong Juang, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 113 days.

(21) Appl. No.: 14/625,106

(22) Filed: Feb. 18, 2015

(65) Prior Publication Data

US 2016/0187369 A1 Jun. 30, 2016

(30) Foreign Application Priority Data

Dec. 29, 2014 (TW) .............................. 103146116 A (51) Int. Cl.
*G01P 15/125* (2006.01)
*G01P 15/08* (2006.01)
(52) U.S. Cl.
CPC ........ *G01P 15/125* (2013.01); *G01P 15/0802* (2013.01); *G01P 2015/0831* (2013.01)

(58) Field of Classification Search
CPC ....................... G01P 15/125; G01P 2015/0831
See application file for complete search history.

(56) References Cited

U.S. PATENT DOCUMENTS 7,258,012 B2 * 8/2007 Xie ...................... B81B 3/0062
73/510
8,171,793 B2 * 5/2012 Foster .................. G01P 15/125
73/504.14

OTHER PUBLICATIONS

Qu et al., "A Single-Crystal Silicon 3-Axis CMOS-MEMS Accelerometer," IEEE Sensors, 2004.*

* cited by examiner

*Primary Examiner* — John Chapman, Jr.
(74) *Attorney, Agent, or Firm* — Huffman Law Group, PC (57) ABSTRACT

The present invention discloses a monolithic z-axis torsional CMOS MEMS accelerometer, it includes a matching frame, two anchors, a first comb structure, a second comb structure and a proof mass. With the implementation of the present invention, the capacitance sensitivity of Z+ direction and Z− direction sensing signals by the accelerometer can be improved. On the other hand, due to the feasibility of applying micromachining etch processes from the top side, the ease and the yield of production are both promoted.

10 Claims, 8 Drawing Sheets

MONOLITHIC Z-AXIS TORSIONAL CMOS MEMS ACCELEROMETER

BACKGROUND OF THE INVENTION

1. Technical Field

The present invention relates to MEMS accelerometers, and more particularly, to a monolithic z-axis torsional CMOS MEMS accelerometer.

2. Description of Related Art

Due to rapid development of semiconductor processes and increasingly sophisticated MEMS technology, sensor structures have a trend toward miniaturization, thereby broadening their application. In this regard, accelerometers are widely used in portable devices and mobile application devices nowadays.

However, the manufacturing processes of most accelerometers are intricate. As a result, their production yield and detection accuracy are greatly limited. Process innovations are put forth at times, but they are focused largely on the field of application and are seldom conducive to the enhancement of the precision and production yield of accelerometers.

Accordingly, it is imperative to provide an accelerometer structure which is easy to manufacture, faces little difficulty in the manufacturing process, exhibits high production yield, has a widened range of operation of the accelerometer, and enhances the sensitivity of the accelerometer. The accelerometer structure thus provided is not only important to the semiconductor industry and MEMS industry but also crucial to the research and application of handheld, mobile, and miniaturized portable devices.

BRIEF SUMMARY OF THE INVENTION

The present invention provides a monolithic z-axis torsional CMOS MEMS accelerometer made of a complementary metal-oxide semiconductor (CMOS) and a MEMS semiconductor. The monolithic z-axis torsional CMOS MEMS accelerometer comprises a curl matching frame, two anchors, a first comb structure, a second comb structure, and a proof mass. According to the present invention, the monolithic z-axis torsional CMOS MEMS accelerometer manifests structural asymmetry and features an impedance structure composed of the first comb structure and the second comb structure which oppose each other, and therefore the monolithic z-axis torsional CMOS MEMS accelerometer is conducive to the enhancement of the sensitivity of an accelerometer and the symmetry of sensing signals. In addition, an etching process can be performed on the front of a complementary metal-oxide semiconductor (CMOS) layers, it reduces the difficulty in the manufacturing process but increases the production yield.

The present invention provides a monolithic z-axis torsional CMOS MEMS accelerometer made of a complementary metal-oxide semiconductor (CMOS) layers with a micromachining process. The monolithic z-axis torsional CMOS MEMS accelerometer comprises: a curl matching frame comprising a first side zone, a second side zone, a third side zone, and a fourth side zone which are successively connected in an enclosing manner, wherein the first side zone and the third side zone are opposite each other, whereas the second side zone and the fourth side zone are opposite each other; two anchors disposed at the first side zone and the third side zone, respectively; a first comb structure adjoining the second side zone, a second side zone-adjoining portion of the first side zone, and a second side zone-adjoining portion of the third side zone; a second comb structure adjoining the fourth side zone, a fourth side zone-adjoining portion of the first side zone, and a fourth side zone-adjoining portion of the third side zone; and a proof mass disposed between the first comb structure and the second comb structure inside the curl matching frame to adjoin the first comb structure and the second comb structure, wherein an axis of the proof mass is defined by a virtual line which connects the two anchors, and two disconnected regions which are symmetrical to each other but do not adjoin the proof mass are disposed between the axis and the first comb structure.

Implementation of the present invention at least involves the following inventive steps:

1. the manufacturing process is simple and incurs low costs;
2. the accelerometer exhibits high sensitivity and satisfactory symmetry; and
3. an etching process can be performed on the front of a complementary metal-oxide semiconductor and the front of a MEMS structure (wherein the fronts oppose the semiconductor substrate) twice to thereby reduce the difficulty in the manufacturing process but effectively increase the production yield.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
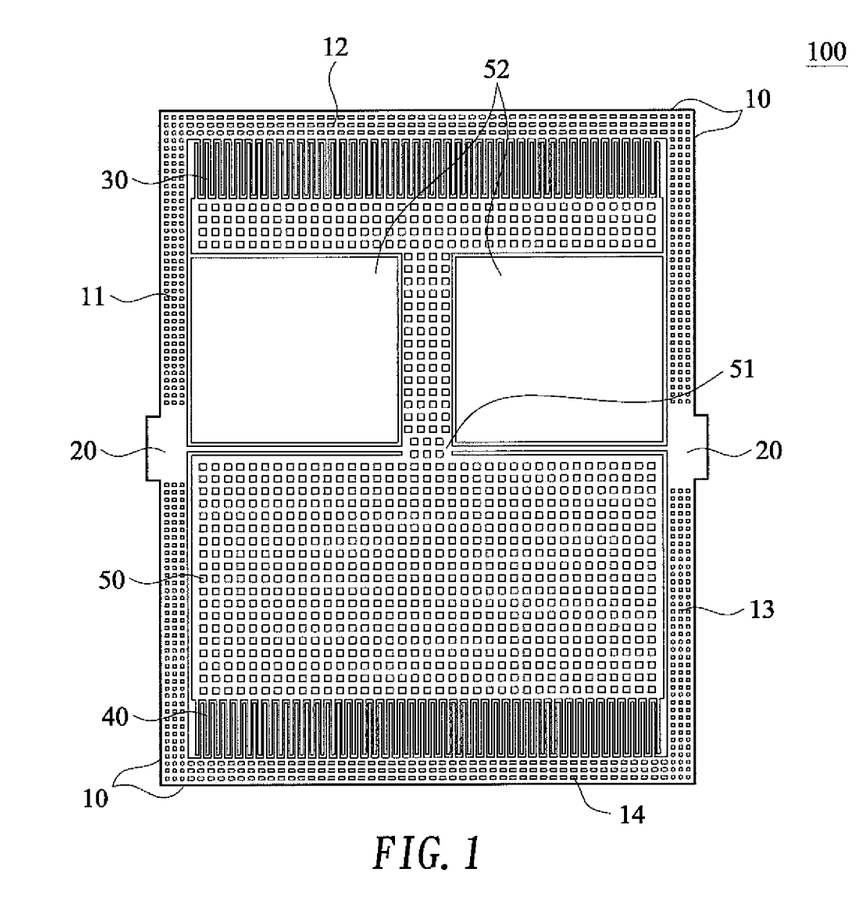
FIG. 1 is a top view of a monolithic z-axis torsional CMOS MEMS accelerometer according to the embodiment of the present invention.

Referring to FIG. 1, in an embodiment of the present invention, a monolithic z-axis torsional CMOS MEMS accelerometer 100, which is made of a complementary metal-oxide semiconductor (CMOS) layers with a micromachining process, comprises a curl matching frame 10, two anchors 20, a first comb structure 30, a second comb structure 40, and a proof mass 50.

Referring to FIG. 1, the curl matching frame 10 comprises first side zone 11, second side zone 12, third side zone 13, and fourth side zone 14 which adjoin successively in an enclosing manner. The first side zone 11 and the third side zone 13 are opposite each other. The second side zone 12 and the fourth side zone 14 are opposite each other. The fourth side zone 14 and the first side zone 11 adjoin. The curl matching frame 10 is made of a complementary metal-oxide semiconductor (CMOS) layers or made of a combination of a complementary metal-oxide semiconductor (CMOS) layers with a micromachining process.

Referring to FIG. 1, the two anchors 20 are disposed at the first side zone 11 and the third side zone 13, respectively. The anchors 20 are located at the midpoint of the first side zone 11 or the midpoint of the third side zone 13.

Referring to FIG. 1, the first comb structure 30 adjoins second side zone 12, a second side zone-adjoining portion of first side zone 11, and a second side zone-adjoining portion of third side zone 13.

Referring to FIG. 1, the second comb structure 40 adjoins fourth side zone 14, a fourth side zone-adjoining portion of first side zone 11, and a fourth side zone-adjoining portion of third side zone 13. The second comb structure 40 and the first comb structure 30 are equal in size and shape.

Both the first comb structure 30 and the second comb structure 40 are made of a complementary metal-oxide semiconductor (CMOS) layers or a combination of a complementary metal-oxide semiconductor (CMOS) layers with a micromachining process.

Referring to FIG. 1, a proof mass 50 disposed between the first comb structure 30 and the second comb structure 40 inside the curl matching frame 10 to adjoin the first comb structure 30 and the second comb structure 40, wherein an axis 51 of the proof mass 50 is defined by a virtual line which connects the two anchors 20, and two disconnected regions 52 which are symmetrical to each other but do not adjoin the proof mass 50 are disposed between the axis 51 and the first comb structure 30.

Due to the disconnected regions 52, the portion of the proof mass 50, which is disposed between the axis 51 and the first comb structure 30, has a lower weight than the portion of the proof mass 50, which is disposed between the axis 51 and the second comb structure 40. Therefore, due to unequal weight of the two ends of the axis 51, the monolithic z-axis torsional CMOS MEMS accelerometer 100 readily undergoes seesawed movement in the Z-axis direction, with the axis 51 functioning as the fulcrum.

The Z-axis direction is perpendicular to the top-view plane of the monolithic z-axis torsional CMOS MEMS accelerometer 100 shown in FIG. 1.

Figure 2:
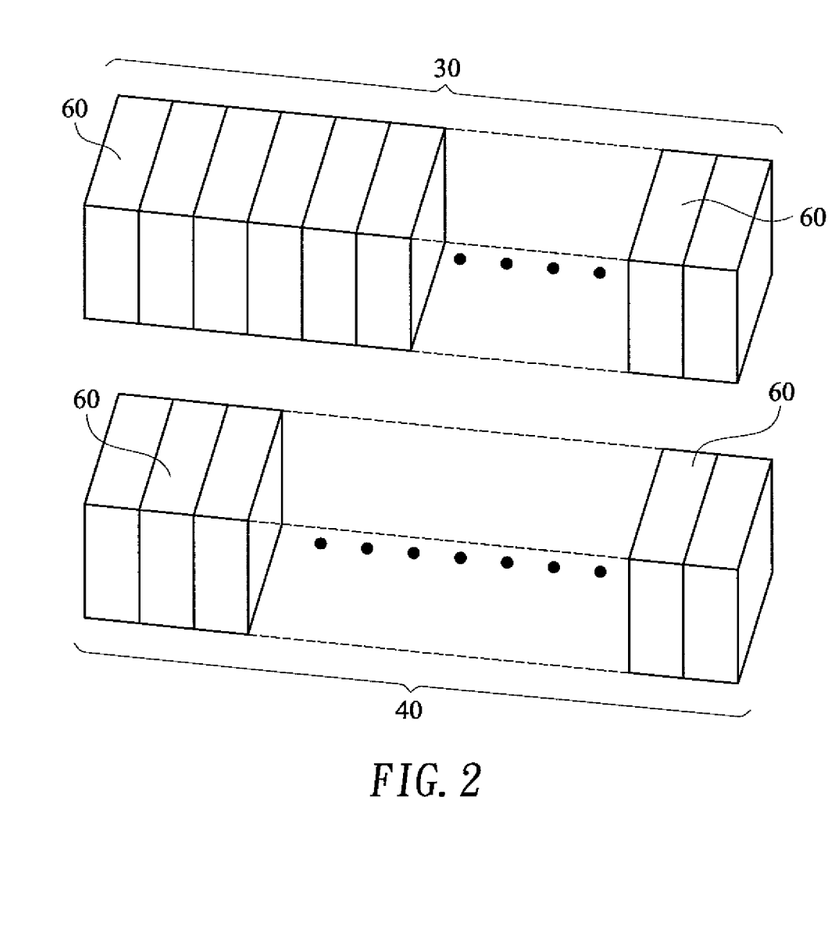
FIG. 2 is a schematic view of a first comb structure and a second comb structure, which are formed from sensing units arranged side by side, according to the embodiment of the present invention.
Figure 3:
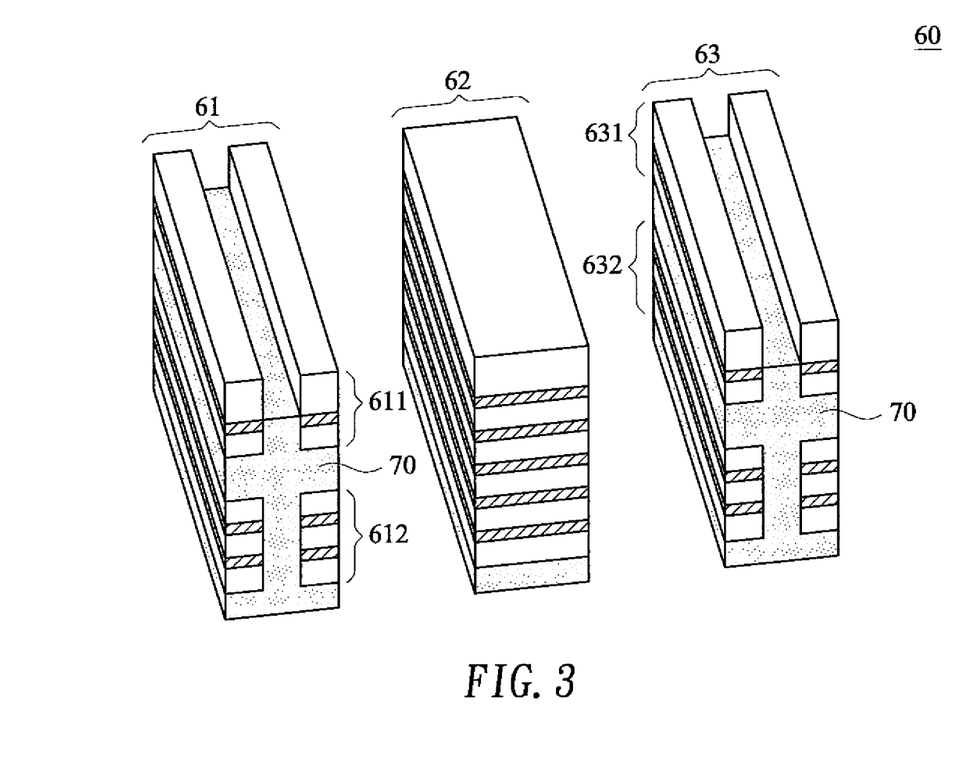
FIG. 3 is a perspective view of a sensing unit according to the embodiment of the present invention.

Referring to FIG. 1, FIG. 2 and FIG. 3, the first comb structure 30 and the second comb structure 40 each comprise a plurality of sensing units 60 arranged side by side. The sensing units 60 are each formed from a first fixed single unit 61, a mobile single unit 62, and a second fixed single unit 63 which are arranged successively but not connected.

Each first fixed single unit 61 and each second fixed single unit 63 of the first comb structure 30 adjoin the second side zone 12. Each first fixed single unit 61 and each second fixed single unit 63 of the second comb structure 40 adjoin the fourth side zone 14. Each mobile single unit 62 adjoins the proof mass 50. Each mobile single unit 62 inside the first comb structure 30 and the second comb structure 40 adjoins the proof mass 50.

Figure 4A:
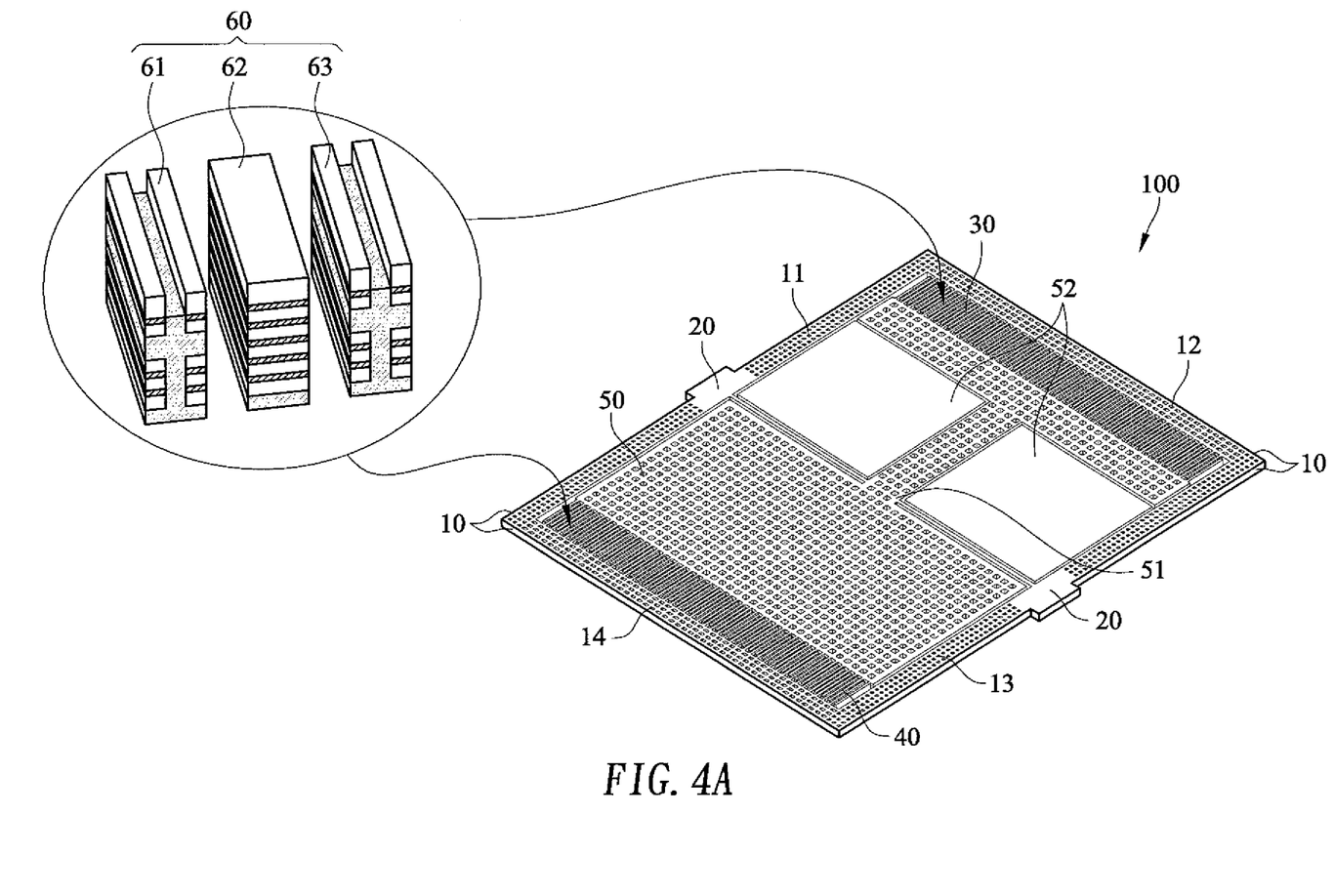
FIG. 4A is a schematic view of a monolithic z-axis torsional CMOS MEMS accelerometer and the sensing unit according to the embodiment of the present invention.

Referring to FIG. 3 and FIG. 4A, the first fixed single units 61 each have a first upper portion 611 and a first lower portion 612 which are separated by a silicon dioxide unit 70. The first upper portion 611 and the mobile single unit 62 together form a first upper capacitor. The first lower portion 612 and the mobile single unit 62 together form a first lower capacitor. The second fixed single units 63 each have a second upper portion 631 and a second lower portion 632 which are separated by the silicon dioxide unit 70. The second upper portion 631 and the mobile single unit 62 together form a second upper capacitor. The second lower portion 632 and the mobile single unit 62 together form a second lower capacitor. It is because capacitive coupling occurs between any two conductors or semiconductors which are not in contact with each other.

Figure 4B:
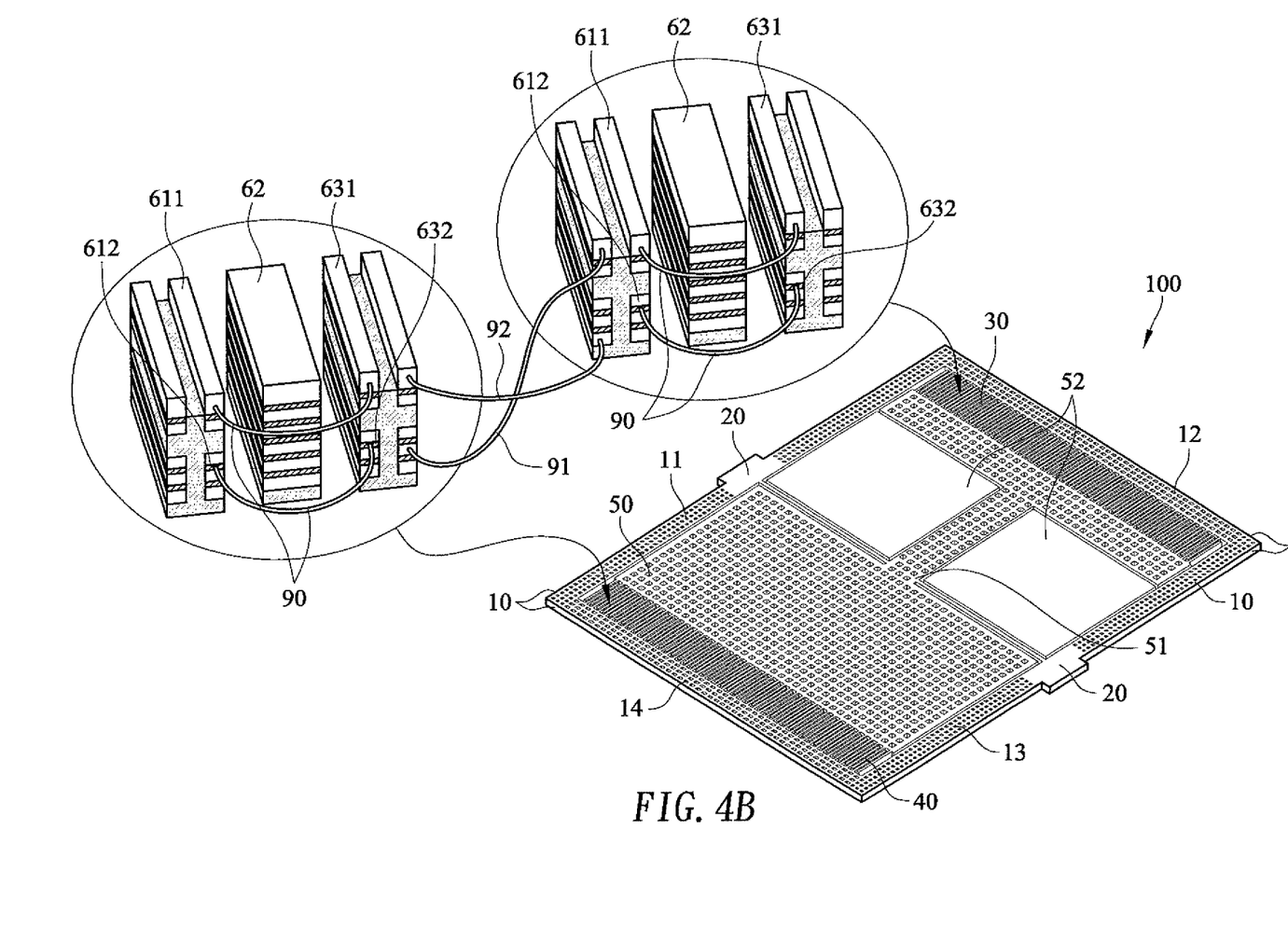
FIG. 4B is a schematic view of the sensing units adapted to form the first comb structure and the second comb structure and electrically connected according to the embodiment of the present invention.

Referring to FIG. 4A and FIG. 4B, it is practicable for each first upper portion 611 and each second upper portion 631 of the first comb structure 30 to be electrically connected by a conductor 90, for each first lower portion 612 and each second lower portion 632 of the first comb structure 30 to be electrically connected by another conductor 90, for each first upper portion 611 and each second upper portion 631 of the second comb structure 40 to be electrically connected by yet another conductor 90, and for each first lower portion 612 and each second lower portion 632 of the second comb structure 40 to be electrically connected by a further conductor 90.

Therefore, the first comb structure 30 and the second comb structure 40 form an upper capacitor and a lower capacitor, respectively. The upper capacitor of the first comb structure 30 connects with each first upper capacitor by the conductor 90. The lower capacitor of the first comb structure 30 connects with each first lower capacitor by the conductor 90. The upper capacitor of the second comb structure 40 connects with each second upper capacitor by the conductor 90. The lower capacitor of the second comb structure 40 connects with each second lower capacitor by the conductor 90.

The first upper portion 611 of the first comb structure 30 is electrically connected to the first lower portion 612 of the second comb structure 40 by a first conductor 91 which penetrates the proof mass 50. The first lower portion 612 of the first comb structure 30 is electrically connected to the first upper portion 611 of the second comb structure 40 by a second conductor 92 which penetrates the proof mass 50. Therefore, it is feasible to not only electrically connect the upper capacitor of the first comb structure 30 to the lower capacitor of the second comb structure 40 but also electrically connect the lower capacitor of the first comb structure 30 to the upper capacitor of the second comb structure 40.

The aforesaid connection technique effectuates compensation and enables Z+ direction and Z− direction (i.e., the two opposite directions of Z-axis direction) to be consistent in capacitance variation. The capacitors of the first comb structure 30 and the second comb structure 40 which flank the axis 51 are connected alternately. Alternatively, electrodes in the semiconductors which flank the axis 51 are equal in their distances from the axis 51, such that the electrodes are equal in their swings from above and below the Z-axis direction, and the connection effectuated alternately equalizes the sensing capacitance at the left and right ends, thereby attaining equal total sensing capacitance and total capacitance variation.

Figure 5:
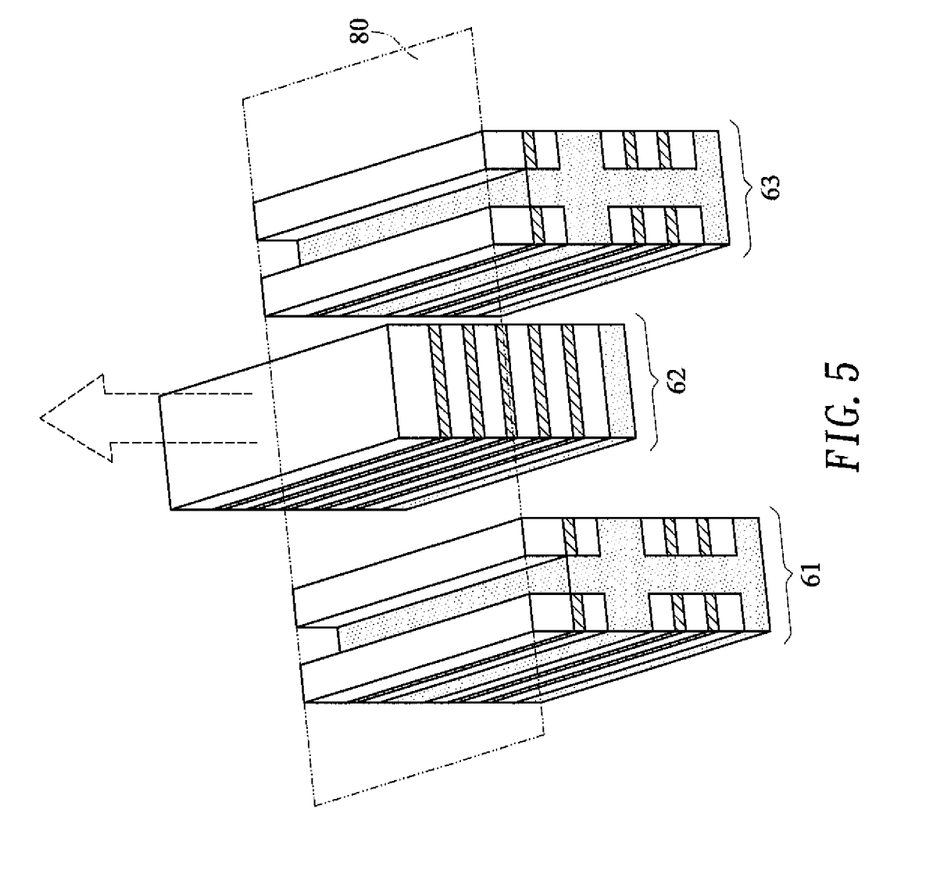
FIG. 5 is a schematic view of a mobile single unit of a sensing unit, which undergoes upward movement in a direction perpendicular to a plane, according to the embodiment of the present invention.
Figure 6:
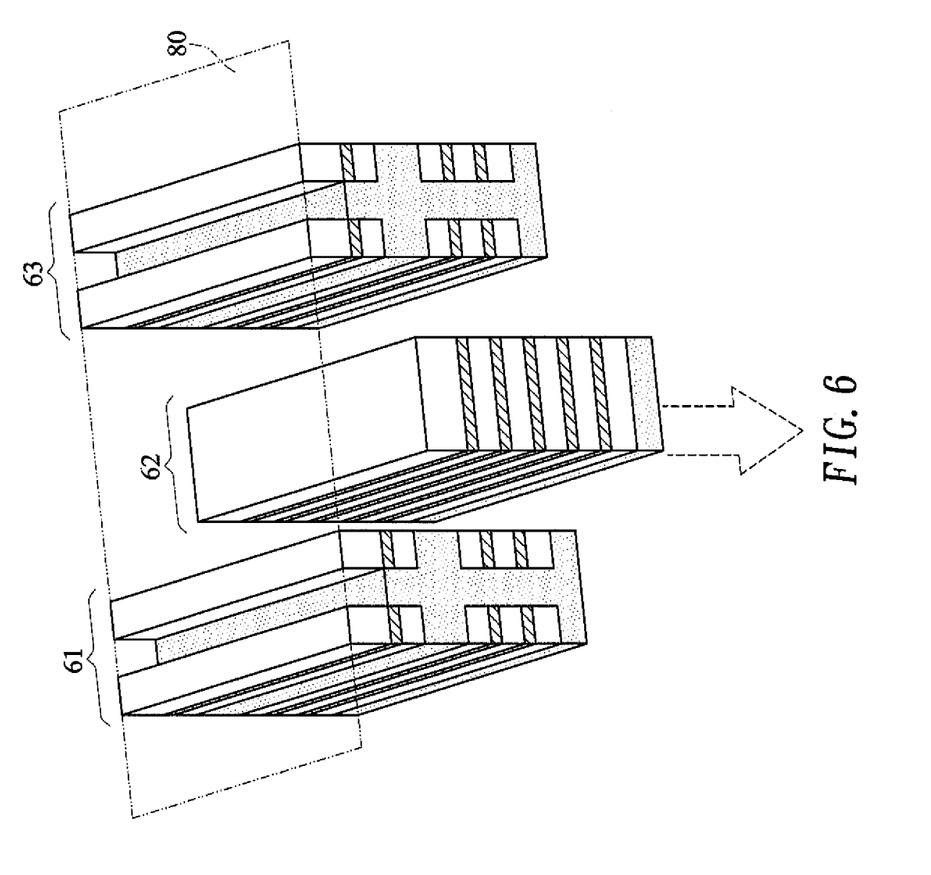
FIG. 6 is a schematic view of a mobile single unit of a sensing unit, which undergoes downward movement in a direction perpendicular to a plane, according to the embodiment of the present invention.

Referring to FIG. 5 and FIG. 6, the upper edge of the first fixed single unit 61 and the upper edge of the second fixed single unit 63 together define a XY plane 80, such that the mobile single unit 62 moves in a direction perpendicular to the XY plane 80. The XY plane 80 is the top-view plane of the monolithic z-axis torsional CMOS MEMS accelerometer 100 shown in FIG. 1. The mobile single unit 62 moves in a direction perpendicular to the XY plane 80, such that the mobile single unit 62 moves up or down in the Z-axis direction. Upward movement along Z-axis is indicated by the arrow shown in FIG. 5, and downward movement along Z-axis is indicated by the arrow shown in FIG. 6.

When the monolithic z-axis torsional CMOS MEMS accelerometer 100 undergoes movement along Z-axis, the proof mass 50 is subjected to forces not uniformly distributed because the weights at the two ends of the axis 51 are unequal. As a result, the proof mass 50 rotates about the axis 51 and drives the mobile single unit 62 on the second comb structure 40 to rotate, and in consequence the capacitance of the first upper capacitor, first lower capacitor, second upper capacitor, and second lower capacitor between the mobile single unit 62 and the first fixed single unit 61 or the second fixed single unit 63 varies when coupled. Given the variations in capacitance, the magnitude of sensed forces applied along Z-axis can be calculated. With the calculated magnitude of the forces applied along Z-axis, it is feasible to estimate or calculate the acceleration along Z-axis, so as for the accelerometer to function well.

Figure 7:
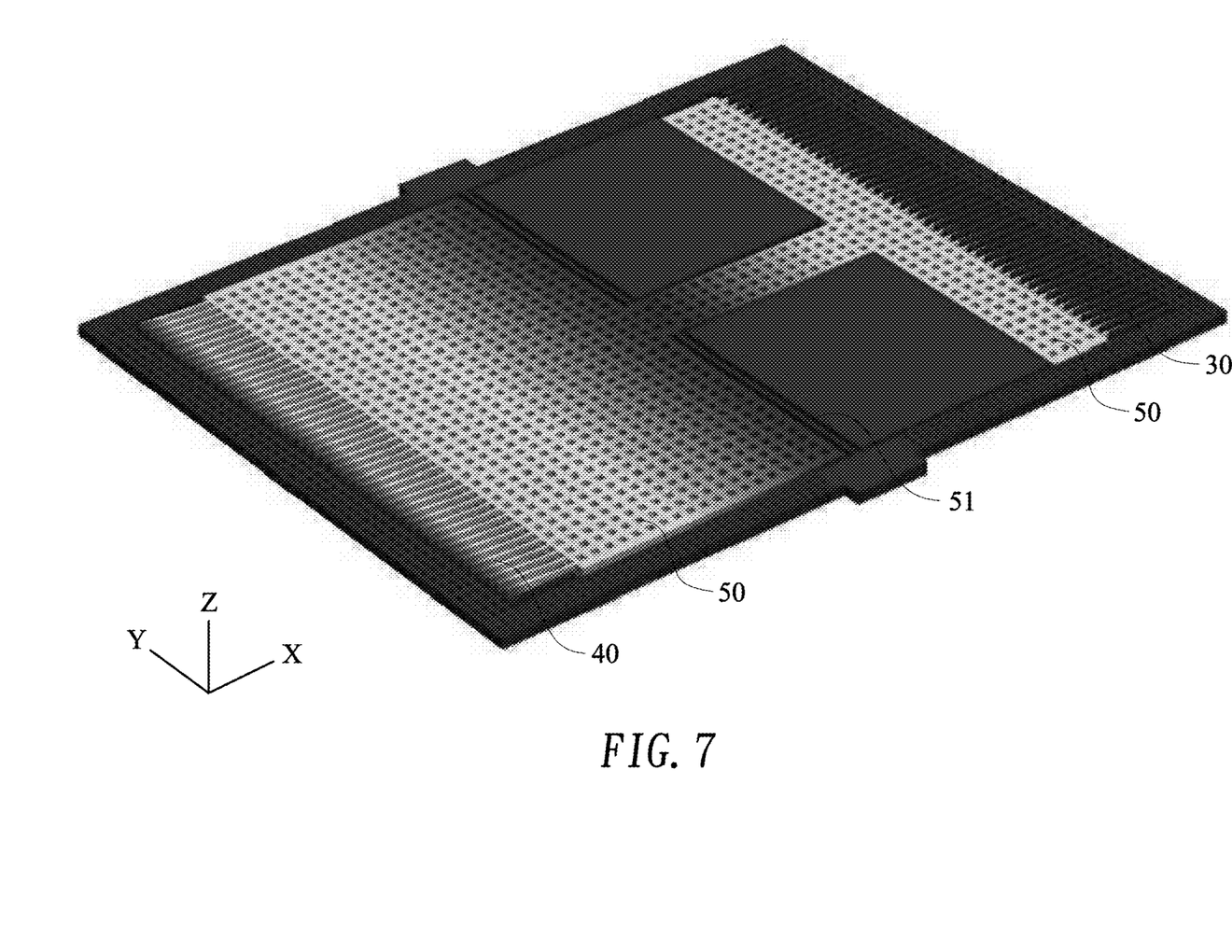
FIG. 7 is a schematic view of the operation of a monolithic z-axis torsional CMOS MEMS accelerometer according to the embodiment of the present invention.

Referring to FIG. 7, there is shown a schematic view of the operation of the monolithic z-axis torsional CMOS MEMS accelerometer 100 according to the embodiment of the present invention. As shown in FIG. 7, the proof mass 50 rotates about the axis 51, because the monolithic z-axis torsional CMOS MEMS accelerometer 100 moves in Z-axis direction. Referring to FIG. 7, both the proof mass 50 and the second comb structure 40, which are on the left, move upward in Z-axis direction, whereas both the proof mass 50 and the first comb structure 30, which are on the right, move downward in Z-axis direction.

During the manufacturing process, the size of the monolithic z-axis torsional CMOS MEMS accelerometer 100 and the ratio of constituent elements of the monolithic z-axis torsional CMOS MEMS accelerometer 100 are subject to change as needed. For instance, the first comb structure 30 shown in FIG. 1 extends 80 μm with an error of <10% from the second side zone 12 to the axis 51, whereas the second comb structure 40 extends 80 μm with an error of <10% from the fourth side zone 14 to the axis 51. The axis 51 is of a length of 276 μm with an error of <10%, and a width of 6 μm with an error of <10%.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A monolithic z-axis torsional CMOS MEMS accelerometer, made of a complementary metal-oxide semiconductor (CMOS) with a micromachining process, and comprising:
    a matching frame comprising a first side zone, a second side zone, a third side zone, and a fourth side zone which adjoin successively in an enclosing manner, wherein the first side zone and the third side zone are opposite each other, whereas the second side zone and the fourth side zone are opposite each other, wherein the fourth side zone and the first side zone adjoin each other;
    two anchors disposed and located at a midpoint of the first side zone and the midpoint of the third side zone, respectively;
    a first comb structure adjoining the second side zone, a second side zone-adjoining portion of the first side zone, and a second side zone-adjoining portion of the third side zone, and the first comb structure having a plurality of sensing units arranged side by side;
    a second comb structure adjoining the fourth side zone, a fourth side zone-adjoining portion of the first side zone, and a fourth side zone-adjoining portion of the third side zone, and the second comb structure having a plurality of sensing units arranged side by side; and
    a proof mass disposed between the first comb structure and the second comb structure inside the matching frame to adjoin the first comb structure and the second comb structure, wherein an axis of the proof mass is defined by a virtual line which connects the two anchors, and two disconnected regions which are symmetrical to each other but do not adjoin the proof mass are disposed between the axis and the first comb structure;
    wherein the sensing units each include a first fixed single unit, a mobile single unit, and a second fixed single unit which are arranged successively but not connected;
    each said first fixed single unit and each said second fixed single unit of the first comb structure adjoin the second side zone;
    each said first fixed single unit and each said second fixed single unit of the second comb structure adjoin the fourth side zone;
    each said mobile single unit adjoins the proof mass;
    wherein the first fixed single units each have a first upper portion and a first lower portion which are separated by a silicon dioxide unit;
    wherein the second fixed single units each have a second upper portion and a second lower portion which are separated by the silicon dioxide unit.

2. The monolithic z-axis torsional CMOS MEMS accelerometer of claim 1, wherein each said first upper portion and each said second upper portion of the first comb structure are electrically connected by a conductor, wherein each said first lower portion and each said second lower portion of the first comb structure are electrically connected by another conductor, wherein each said first upper portion and each said second upper portion of the second comb structure are electrically connected by yet another conductor, wherein each said first lower portion and each said second lower portion of the second comb structure are electrically connected by a further conductor, wherein the first upper portion of the first comb structure is electrically connected to the first lower portion of the second comb structure by a first conductor penetrating the proof mass, wherein the first lower portion of the first comb structure is electrically connected to the first upper portion of the second comb structure by a second conductor penetrating the proof mass.

3. The monolithic z-axis torsional CMOS MEMS accelerometer of claim 2, wherein an upper edge of the first fixed single unit and an upper edge of the second fixed single unit together define a XY plane, wherein the mobile single unit moves in a direction perpendicular to the XY plane.

4. The monolithic z-axis torsional CMOS MEMS accelerometer of claim 2, wherein the first comb structure and the second comb structure are equal in size and shape.

5. The monolithic z-axis torsional CMOS MEMS accelerometer of claim 2, wherein the first comb structure extends 80 μm with an error of <10% from the second side zone to the axis, wherein the second comb structure extends 80 μm with an error of <10% from the fourth side zone to the axis.

6. The monolithic z-axis torsional CMOS MEMS accelerometer of claim 2, wherein the axis is of a length of 276 μm with an error of <10%, and is of a width of 6 μm with an error of <10%.

7. The monolithic z-axis torsional CMOS MEMS accelerometer of claim 1, wherein an upper edge of the first fixed single unit and an upper edge of the second fixed single unit together define a XY plane, wherein the mobile single unit moves in a direction perpendicular to the XY plane.

8. The monolithic z-axis torsional CMOS MEMS accelerometer of claim 1, wherein the first comb structure and the second comb structure are equal in size and shape.

9. The monolithic z-axis torsional CMOS MEMS accelerometer of claim 1, wherein the first comb structure extends 80 μm with an error of <10% from the second side zone to the axis, wherein the second comb structure extends 80 μm with an error of <10% from the fourth side zone to the axis.

10. The monolithic z-axis torsional CMOS MEMS accelerometer of claim 1, wherein the axis is of a length of 276 μm with an error of <10%, and is of a width of 6 μm with an error of <10%.

* * * * *